United States Patent [19]

Liang et al.

[11] Patent Number: 5,781,529
[45] Date of Patent: Jul. 14, 1998

[54] SYSTEMS AND METHODS FOR ROUTING ATM SWITCHED VIRTUAL CIRCUIT CALLS

[75] Inventors: Chung C. Liang, Naugatuck; Javier R. Rojas, Danbury; Kuldip S. Bains, Middlebury, all of Conn.

[73] Assignee: General DataComm, Inc., Middlebury, Conn.

[21] Appl. No.: 624,812

[22] Filed: Mar. 27, 1996

[51] Int. Cl.$^6$ .................................................. H04L 12/56
[52] U.S. Cl. .................... 370/218; 370/237; 370/393; 370/397; 370/410
[58] Field of Search .................... 370/217, 218, 370/230, 231, 235, 236, 237, 238, 355, 389, 392, 393, 395, 396, 397, 399, 400, 401, 409, 410, 471, 474; 340/825.03, 826, 827; 395/200.68, 200.79, 200.8

[56] References Cited

U.S. PATENT DOCUMENTS

| | | | |
|---|---|---|---|
| 5,392,402 | 2/1995 | Robrock, II | 370/399 |
| 5,539,884 | 7/1996 | Robrock, II | 370/399 |
| 5,572,522 | 11/1996 | Calamvokis et al. | 370/395 |
| 5,579,480 | 11/1996 | Cidon et al. | 370/397 |
| 5,592,476 | 1/1997 | Calamvokis et al. | 370/395 |

OTHER PUBLICATIONS

The ATM Forum PNNI Tutorial, edition 1.0–2.
User–Network Interface (UNI) Specification Version 3.1, The ATM Forum Technical Committee.
ATM Forum 94–0471R15 PNNI Draft Specification, PNNI SWG.

*Primary Examiner*—Alpus H. Hsu
*Attorney, Agent, or Firm*—David P. Gordon; David S. Jacobson; Thomas A. Gallagher

[57] ABSTRACT

The invention routes SVC ATM call setups by utilizing one of a plurality of designated transit lists (DTLs) stored at an originating node. The DTLs describe all routes in the network from the originating node to endpoint destinations. When a call setup message is received at the originating node, it inserts a desired DTL as an information element (IE) of the setup message. Each DTL is formatted as a concatenation of elements with each element including the node ID and output ports of each successive node in the route. Preferably, each element of the DTL includes flags such as a "process" flag which indicates whether an element of the DTL has been processed by a node, a "link up" flag which indicates that an alternative route is available between two nodes should the preferred route be down, a "bandwidth" flag which allows the alternate link to be used if the preferred link is busy, and a "last node" flag which is used in the last element of the concatenated DTL. If the "last node" flag is not set, the destination node internally generates a route ID as the last element based on the destination address specified in an IE for the call. As the DTL IE is passed from node to node along the connection path, the receiving node inserts the input port at which it received the call setup message as well as a VPI/VCI into its element of the DTL. At its destination, the DTL is attached to a CONNECT request message which is returned to the source node.

30 Claims, 7 Drawing Sheets

SETUP

THIS MESSAGE IS SENT BY THE CALLING USER TO THE NETWORK AND BY THE NETWORK TO THE CALLED USER TO INITIATE CALL ESTABLISHMENT.

MESSAGE TYPE: SETUP

SIGNIFICANCE: GLOBAL

DIRECTION: BOTH

| INFORMATION ELEMENT | REFERENCE | DIRECTION | TYPE | LENGTH |
|---|---|---|---|---|
| PROTOCOL DISCRIMINATOR SETUP | 5.4.2 | BOTH | M | 1 |
| CALL REFERENCE | 5.4.3 | BOTH | M | 4 |
| MESSAGE TYPE | 5.4.4.1 | BOTH | M | 2 |
| MESSAGE LENGTH | 5.4.4.2 | BOTH | M | 2 |
| AAL PARAMETERS | 5.4.5.5 | BOTH | $O^{(1)}$ | 4–21 |
| ATM TRAFFIC DESCRIPTOR | 5.4.5.6 | BOTH | M | 12–30 |
| BROADBAND BEARER CAPABILITY | 5.4.5.7 | BOTH | M | 6–7 |
| BROADBAND HIGH LAYER INFORMATION | 5.4.5.8 | BOTH | $O^{(2)}$ | 4–13 |
| BROADBAND REPEAT INDICATOR | 5.4.5.19 | BOTH | $O^{(3)}$ | 4–5 |
| BOARDBAND LOW LAYER INFORMATION | 5.4.5.9 | BOTH | $O^{(4)}$ | 4–17 |
| CALLED PARTY NUMBER | 5.4.5.11 | BOTH | M | (5) |
| CALLED PARTY SUBADDRESS | 5.4.5.12 | BOTH | $O^{(6)}$ | 4–25 |
| CALLED PARTY NUMBER | 5.4.5.13 | BOTH | $O^{(7)}$ | 4–26 |
| CALLED PARTY SUBADDRESS | 5.4.5.14 | BOTH | $O^{(8)}$ | 4–25 |
| CONNECTION IDENTIFIER | 5.4.5.16 | N → U | M | 9 |
| QoS PARAMETER | 5.4.5.18 | BOTH | M | 6 |
| BROADBAND SENDING COMPLETE | 5.4.5.21 | BOTH | $O^{(9)}$ | 4–5 |
| TRANSIT NETWORK SELECTION | 5.4.5.22 | U → N | $O^{(10)}$ | 4–8 |
| ENDPOINT REFERENCE | 5.4.8.1 | BOTH | $O^{(11)}$ | 4–7 |
| ROUTING DTL | | | | 6–60 |

NOTE 1 – INCLUDED IN THE USER-TO-NETWORK DIRECTION WHEN THE CALLING USER WANTS TO PASS ATM ADAPTATION LAYER PARAMETERS INFORMATION TO THE CALLED USER. INCLUDED IN THE NETWORK-TO-USER DIRECTION IF THE CALLING USER INCLUDED AN ATM ADAPTATION LAYER PARAMETERS INFORMATION ELEMENT IN THE SETUP MESSAGE.

CONNECT
THIS MESSAGE IS SENT BY THE CALLED USER TO THE NETWORK AND BY THE NETWORK TO THE CALLING USER TO INDICATE CALL ACCEPTANCE BY THE CALLED USER.
MESSAGE TYP: CONNECT
SIGNIFICANCE: GLOBAL
DIRECTION: BOTH

| INFORMATION ELEMENT | REFERENCE | DIRECTION | TYPE | LENGTH |
|---|---|---|---|---|
| PROTOCOL DISCRIMINATOR | 5.4.2 | BOTH | M | 1 |
| CALL REFERENCE | 5.4.3 | BOTH | M | 4 |
| MESSAGE TYPE | 5.4.4.1 | BOTH | M | 2 |
| MESSAGE LENGTH | 5.4.4.2 | BOTH | M | 2 |
| AAL PARAMETERS | 5.4.5.5 | BOTH | O (1) | 4-11 |
| BOARDBAND LOW LAYER INFORMATION | 5.4.5.9 | BOTH | O (2) | 4-17 |
| CONNECTION IDENTIFIER | 5.4.5.16 | BOTH | O (3) | 4-9 |
| ENDPOINT REFERENCE | 5.4.8.1 | BOTH | O (4) | 4-7 |
| ROUTING DTL | | | | 6-60 |

NOTE 1-
INCLUDED IN THE USER-TO-NETWORK DIRECTION WHEN THE CALLED USER WANTS TO PASS ATM ADAPTATION LAYER PARAMETERS INFORMATION TO THE CALLING USER, AND THE ATM ADAPTATION LAYER PARAMETERS INFORMATION ELEMENT WAS PRESENT IN THE SETUP MESSAGE. INCLUDED IN THE NETWORK TO-USER DIRECTION IF THE CALLED USER INCLUDED AN ATM ADAPTATION LAYER PARAMETERS INFORMATION ELEMENT IN THE CONNECT MESSAGE. THE ATM ADAPTATION LAYER PARAMETERS INFORMATION ELEMENT SHALL NOT BE PRESENT WHEN THE ENDPOINT REFERENCE INFORMATION ELEMENT WAS PRESENT IN THE SETUP MESSAGE AND CONTAINED A NON-ZERO VALUE.

NOTE 2-
INCLUDED IN THE USER-TO-NETWORK DIRECTION WHEN THE ANSWERING USER WANTS TO RETURN LOW LAYER INFORMATION TO THE CALLING USER. INCLUDED IN THE NETWORK-TO-USER DIRECTION IF THE USER AWARDED THE CALL INCLUDED A BROADBAND LOW LAYER INFORMATION ELEMENT IN THE CONNECT MESSAGE. OPTIONALLY INCLUDED FOR BROADBAND LOW LAYER INFORMATION NEGOTIATION, BUT SAME NETWORKS MAY NOT TRANSPORT THIS INFORMATION ELEMENT TO THE CALLING USER (SEE ANNEX C.)

NOTE 3-
MANDATORY IN THE NETWORK-TO-USER DIRECTION IF THIS MESSAGE IS THE FIRST MESSAGE IN RESPONSE TO A SETUP MESSAGE. IT'S MANDATORY IN THE USER-TO-NETWORK DIRECTION IF THIS MESSAGE IS THE FIRST RESPONSE TO A SETUP MESSAGE UNLESS THE USER ACCEPTS THE CONNECTION IDENTIFIER INDICATED IN THE SETUP MESSAGE.

NOTE 4-
MANDATORY IF THE ENDPOINT REFERENCE WAS INCLUDED IN THE SETUP MESSAGE.

FIG.8

SYSTEMS AND METHODS FOR ROUTING ATM SWITCHED VIRTUAL CIRCUIT CALLS

BACKGROUND OF THE INVENTION

1. Field of the Invention

The present invention relates generally to the field of telecommunications. More particularly, the present invention relates to the routing of ATM switched virtual circuit (SVC) calls.

2. State of the Art

Two primary techniques for the routing of SVCs in an ATM network are known. A first routing technique is known as static routing such as is disclosed in the Interim Interswitch Signalling Protocol (IISP) of the ATM Forum Document 94-0924R3 which is hereby incorporated by reference herein in its entirety. Section 8.1 of the ATM Forum Document 94-0924R3 discusses a fixed routing algorithm with static routes. In particular, in static routing, each switching node in the ATM network is provided with a routing look-up table for all destinations in the switching network which can be reached from the node. The routing look-up table is stored in memory associated with the switch. When a call setup message is received at a node, regardless of whether it is the originating (source) node or a transit node, the node looks at the incoming call for its destination (called address), and accesses the look-up table in order to determine how best to process the call (i.e., how to switch the call to the desired output port). The call setup proceeds from node to node in this manner as it works its way through the ATM network to its destination.

It is appreciated by those skilled in the art that static routing techniques such as IISP suffer from many drawbacks. A primary problem with the static routing of the art is that the processing time for finding a route can be large, as many look-ups are required when many nodes are accessed. Of course, from a customer point of view, a lengthy call setup can be unacceptable. In addition, as the ATM network increases in size, the storage required for the routing tables at each node become extremely large. Not only does this introduce added expense to the system, but it further slows down the call routing process. Furthermore, in the prior art static routing, a change of routes must be coordinated and synchronized among the many switches involved in the route to avoid inadvertent erroneous routing, as the prior art static routing is distributed among the nodes.

A second technique for the routing of call setup messages in an ATM network is known as dynamic routing such as is disclosed in PNNI (Private Network to Network Interface or Private Network Node Interface) which is discussed in detail in ATM Forum Document 94-0471R15 which is hereby incorporated by reference herein in its entirety. In Appendix H of the ATM Forum Document 94-0471R15, a route generation algorithm is disclosed. Basically, adaptive routing such as PNNI routing requires that each node exchange information (link state information) with other nodes in its peer group regarding the connection topology (links) between itself and the other peer nodes, as well as exchanging less detailed information regarding the connection topology of nodes outside the peer group. This information exchange is done on a regular basis in order to keep the status of the links in the network updated. When a call setup request is received at an originating node, the originating node utilizes the information it has received in order to generate a stack of "Designated Transit Lists" (DTLs) for the routing of the call setup request through the network hierarchy. A DTL essentially constitutes a string of node identifications which is sent in conjunction with the call setup request and is therefore effectively a source routing technique.

If the called address is within the peer nodes of the originating node, the DTL stack has a single DTL for the single level which contains all the information necessary for the routing of the call setup request. On the other hand, if the called address is outside the peer nodes of the originating node, the DTL is set up as a hierarchical DTL stack with at least two levels, with detailed information being inserted into the lower level portion of the DTL stack, and basic information being inserted into the higher level portion of the DTL stack. Regardless of the DTL form, the originating node forwards the call setup request with the DTL to the first designated node in the DTL. That node receives the request which contains the DTL, routes the request as directed by the DTL, and forwards the request to the next node. The next node repeats the same process and forwards the request to the next designated node, etc. If the called address is at a node within the peer group, the process continues until the called address (i.e., the last node identified in the DTL) is reached, at which point the DTL is deleted. However, if the called address is at a node outside the peer group, when the call setup request reaches a "border" node, the border node fills in the detail for the next higher level portion of the DTL, deletes the portion of the DTL relating to the peer group level, and the process is continued as described.

While the dynamic routing such as PNNI has many advantages over static routing such as IISP, PNNI and other dynamic routing techniques have not to date been used commercially because they suffer from the disadvantages of the extreme complexity required by the link state information exchange, as well as the complexities of coordination, management, and processing. In fact, the simpler IISP protocol was specifically introduced as a more simple interim substitute for PNNI because of the complexities of the PNNI routing protocol. It will also be appreciated that the IISP protocol as well as other static routing techniques described in the art suffer from the inability to collect diagnostic information regarding routing difficulties.

SUMMARY OF THE INVENTION

It is therefore an object of the invention to provide a routing technique for SVC call setup.

It is another object of the invention to provide an SVC ATM call setup routing technique which requires neither link state information exchanges nor memory table look-ups.

It is a further object of the invention to provide methods and systems for SVC ATM call setup routing utilizing modified designated transit lists (DTLs).

It is an additional object of the invention to provide an SVC ATM call setup routing system where only certain nodes require memory for routing, and where the amount of memory required at those switch nodes is limited relative to the standard static routing techniques.

Another object of the invention is to provide a DTL for SVC ATM call setup routing which is filled in by the nodes involved for the call setup as the request is routed through the nodes and which is returned to the source node during a routing "connect" request and available for diagnostics.

A further object of the invention is to provide a modified DTL for SVC ATM call setup routing which includes one or more flags which allows limited rerouting based on node intelligence.

In accord with these objects of the invention which will be discussed in detail below, the method of the present invention for routing SVC ATM call setups broadly comprises storing a plurality of designated transit lists at an originating node (source node). Ideally, the designated transit lists can describe all possible routes in the network from the source node to any possible endpoint destination. When a call setup message (typically as defined according to standards such as ITU-T Q.2931 and ATM Forum specification UNI-3.1) is received at the node, the node inserts a desired designated transit list (DTL) as an information element (IE) of the setup message. Each DTL is formatted as a concatenation of elements with each element including at a minimum the node identification and output ports of each successive node in the route. In addition, in accord with a preferred aspect of the invention, each element of the DTL includes one or more flags. As will be discussed hereinafter, as the DTL IE is passed from node to node along the connection path, the receiving node inserts the input port at which it received the call setup message as well as a VPI/VCI into its element of the DTL.

The flags of the DTL provide additional functionality to the routing system. For example, a "process" flag is used to indicate whether an element of the DTL has been processed by a node. Thus, when a node receives the DTL, it looks for the first element of the DTL which has not had the process flag set. That element should have the node ID matching the ID of the receiving node. Upon finding the appropriate DTL element, the receiving node changes the process flag of the element (rather than deleting the element), and as aforementioned, inserts a VPI/VCI along with the input port designation for its element into the DTL, and forwards the message with the updated DTL to the output port designated by the DTL. By utilizing the process flag rather than deleting the DTL element from the DTL upon processing, the updated DTL can be sent back from any failure point in the system. The returned information can then be used for diagnostic purposes. Likewise, and in accord with another aspect of the invention, upon reaching its destination, the DTL is attached to a CONNECT request message which is sent back to the originating node.

A "link up" flag is used to indicate that an alternative route (parallel link) is available between two nodes so that if the designated link is down, the node can route the call setup message (if permitted by the link up flag) via the alternate link without kicking the request back to the originating node. Similarly, a "bandwidth" flag can be used to indicate that where an alternative route is available between two nodes, should the preferred link be too busy, the alternate link can be utilized.

A "last node" flag is used in the last element of the concatenated DTL to indicate to the receiving node that the receiving node is the destination node. If this flag is not set, upon receipt by the destination node, the destination node will internally generate a route ID as the last element based on the destination address specified in an information element for the call. The last node flag therefore permits routes to numerous destinations which fan out from a single destination node to be stored as a single DTL, thereby reducing memory requirements of the system. The last node flag can also be used in a hierarchical system to cause the DTL to be provided to a bridge node which can attach additional elements for routing at another hierarchical level.

According to another preferred aspect of the invention, means are provided at the source node to avoid during call set up previously failed routes and routes which incorporate failed hops. In a first embodiment, a list of failed hops is stored, and the hops of each selected DTL are scanned and compared to the list. If there is a match, the route indicated by the DTL is avoided so as to avoid processing routes which are likely to fail, and another route is chosen for scanning and comparison. After a preset time period on the list, a failed hop may be removed from the list and tried again. In a second embodiment, an index table sorted by destinations is maintained at the source node to provide groups of DTLs. Initially, the index for each destination is set to point to a first DTL for the group. If a call attempt is rejected due, e.g., to a failed hop, the index (pointer) for this destination is changed to the next available DTL in the group which does not contain the failed hop so as to prevent processing of routes which are likely to fail. Again, all indices may be reset to their initial values on a periodic basis which is reasonably long enough such that a previously failed route might have had a chance to recover.

The routing methods and systems of the invention which utilize DTLs clearly eliminate the need for determining routes at intermediate nodes as required by prior art static routing protocols, thereby speeding up the connection process and reducing the memory required at the intermediate non-source nodes. In addition, by avoiding the state link information exchange required by prior art dynamic routing protocols, the routing methods and systems of the invention are relatively simple to implement. Furthermore, because of the flexibility provided by the DTL flags of the present invention, the routing methods and systems of the present invention provides better diagnostics regarding failed calls, and allows easier access to routing information by users. The flags also are able to provide the system with a certain amount of dynamic rerouting which in many cases will reduce the time to establish a route.

Additional objects and advantages of the invention will become apparent to those skilled in the art upon reference to the detailed description taken in conjunction with the provided figures.

BRIEF DESCRIPTION OF THE DRAWINGS

FIG. 3 is a diagram of a level 3 packet format for a call setup message according to the invention.

FIG. 6 is a diagram of a DTL table of a node of FIG. 1.

FIG. 8 is a diagram of a level 3 packet format for a call connect message according to the preferred embodiment of the invention.

DETAILED DESCRIPTION OF THE PREFERRED EMBODIMENTS

Figure 1:
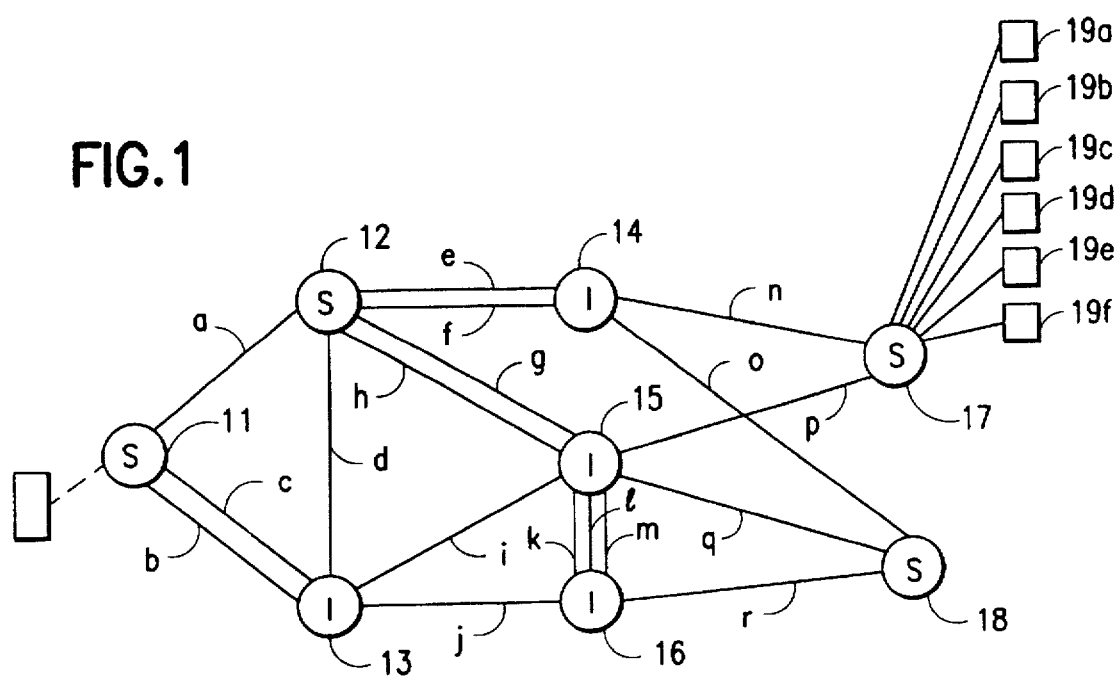
FIG. 1 is a diagram representing an ATM network having source and intermediate nodes, and channels connecting the nodes.

A hypothetical ATM network 10 is seen in FIG. 1, and includes eight nodes 11–18, with nodes 11, 12, 17, and 18 being "source" nodes as indicated by the "S" marking, and nodes 13–16 being "intermediate" nodes as indicated by the "I" marking. A node is a source node when data is received by the node from one or more terminals (DTEs) connected to it, or when data is intended to terminate at the node or at other terminals or destinations coupled to it. Thus, source node 17 is shown with six DTE destinations 19a–19f which fan out from it. While source nodes 11, 12, and 18 are not shown with accompanying sources/destinations, it will be appreciated that such sources/destinations will be typically be present.

The nodes 11–18 are shown coupled to each other by links (hops) "a" through "r". Node 11 is coupled to node 12 by link "a", and to node 13 by links "b" and "c". With the network configured as shown, it will be appreciated that they are numerous routes between, e.g., nodes 11 and 17. For example, six of the simplest routes would be a-e-n, a-f-n, a-g-p, a-h-p, b-i-p, or c-i-p. Should links "a" and "i" be down, a more complex route would be required such as b-d-e-n, c-d-e-n, b-d-f-n, c-d-f-n, b-j-k-p, etc. Of course, even more complex routes such as c-j-r-q-g-f-n are possible. It should be appreciated that because parallel links are available between various of the nodes (links b and c between nodes 11 and 13, links k, l, and m between nodes 15 and 16, links g and h between nodes 12 and 15, and links e and f between nodes 12 and 14), even if one link is down between two nodes, it is often possible to select a simple route.

Figure 2:
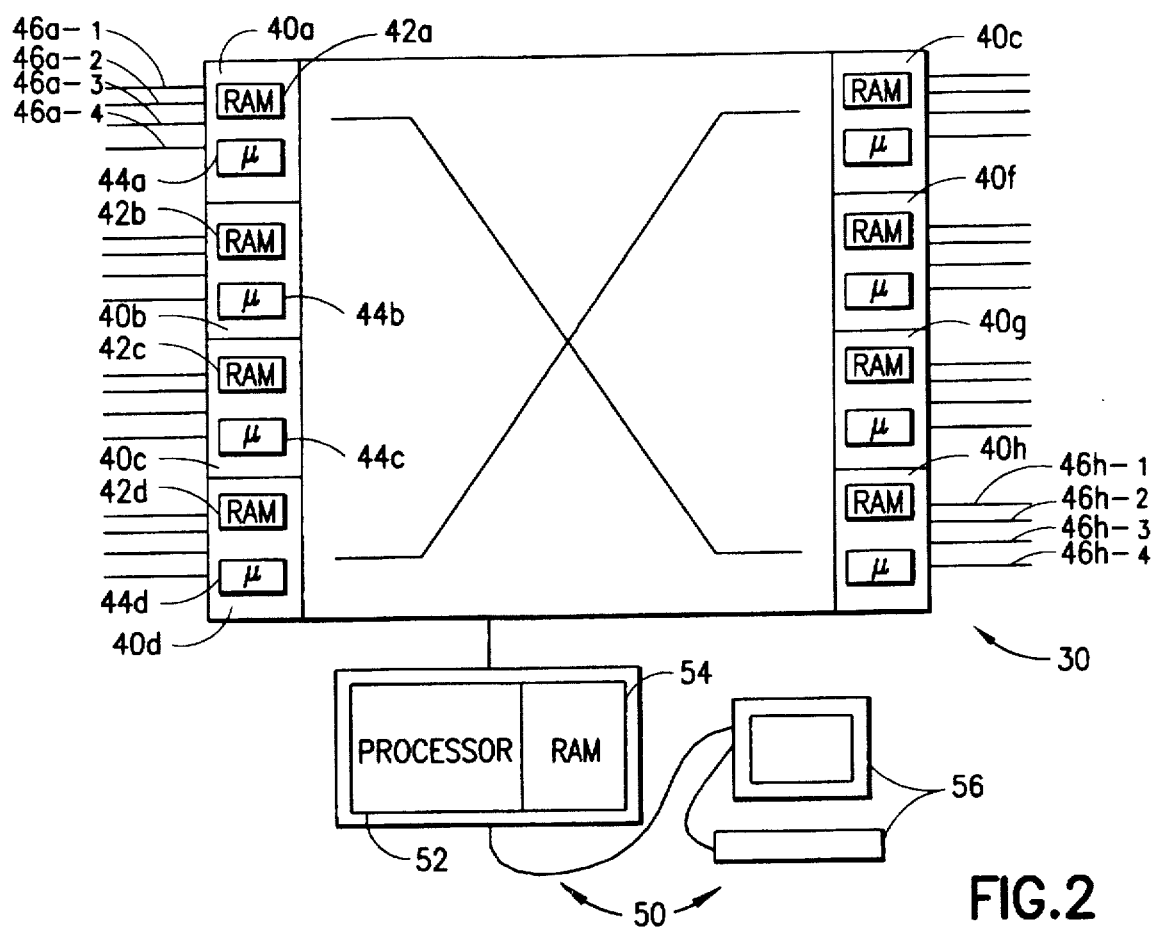
FIG. 2 is a high level block diagram of a source node of FIG. 1 according to a preferred embodiment of the invention.

The equipment at each of the nodes is typically complex equipment generally known to those skilled in the art. According to a preferred embodiment of the invention, the nodes include an APEX switch 30 which is commercially available from General DataComm, Inc. of Middlebury, Conn., although other switches could be utilized. A high level block diagram of the preferred APEX switch is seen in FIG. 2, with eight data processing modules or "slots" 40a–40h and a cross-connect switch 41 being provided. Each module 40 includes a memory element or RAM 42a–42h, and a processing element (slot controller) or microprocessor 44a–44h, and supports four ports (links) 46a-1, 46a-2, 46a-3, 46a-4, 46b-1, . . . 46h-4. In addition, as indicated in FIG. 2, an external workstation 50 with its own processor 52, memory 54, and terminal 56 may be coupled to the APEX switch 41 for loading configuration and other information into the switch, and for receiving diagnostic and other information from the switch. It will be appreciated that the workstation 50 can be a SPARC workstation commercially available by Sun Microsystems of Cupertino, Calif. or the like.

According to a preferred aspect of the invention, the switches 30 of the invention are designed to substantially meet broadband ISDN routing protocol and conform to the routing specifications of the ITU-T Q.2931 Recommendation as well as the ATM Forum specification UNI-3.1. Thus, incoming calls which are to be routed by the source switch are typically formatted as level 3 messages which sit atop a signalling ATM Adaptation Layer (SAAL) and the physical layer interface (e.g., ATM, DS1, DS3, OC3, E1, E3). The preferred format of a level 3 SETUP message is seen in FIG. 3, with several "information elements", some of which are mandatory, and some of which are optional according to the Standards and Recommendations. The first information element (IE) is the one byte protocol discriminator, which for a CALL SETUP message has a value of 00001001 according to Section 5.4.2 of the UNI Specification 3.1. Another mandatory information element of interest (and which will be discussed in more detail hereinafter) is the called party number IE which identifies the called party. Likewise, the connection identifier information element which provides a VPI/VCI as set forth in Section 5.4.5.16 of the UNI Specification 3.1 is mandatory from the network side.

Figure 4:
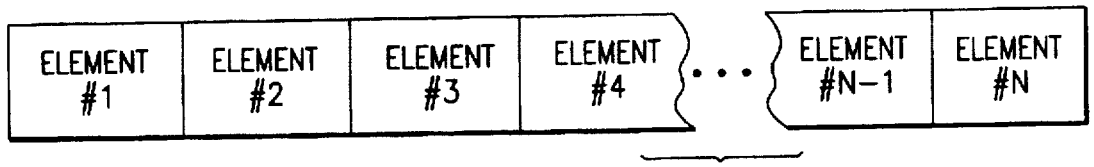
FIG. 4 is a diagram of the routing information element of the call setup message of FIG. 3.
Figure 5:
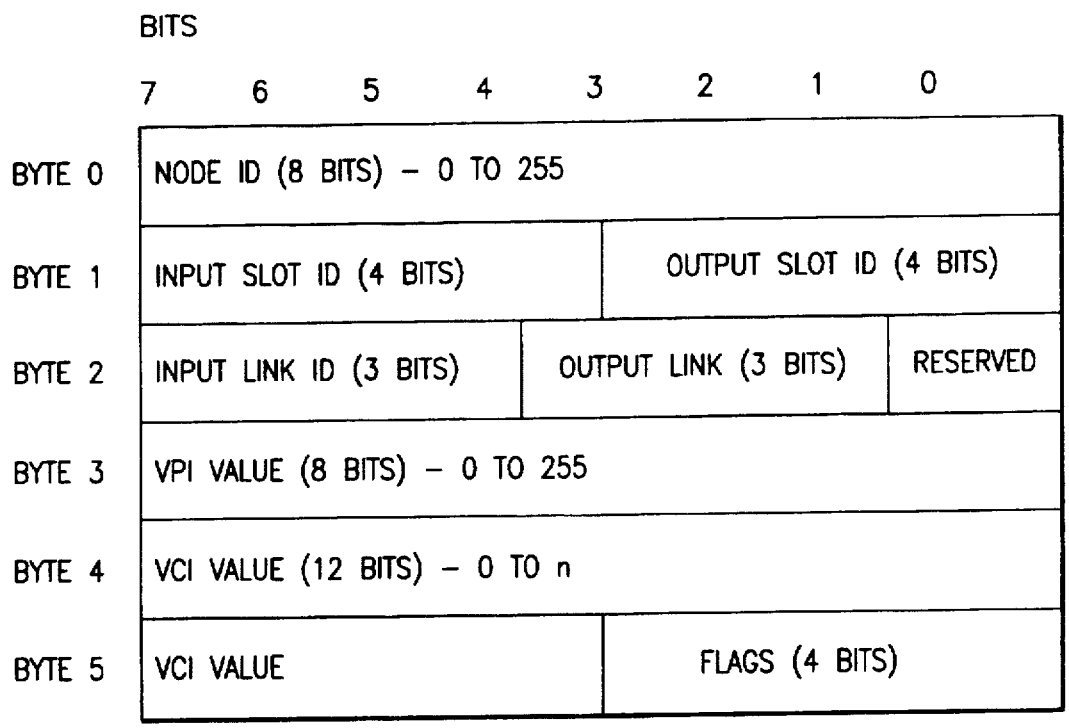
FIG. 5 is a diagram of the format of one element of the routing information element of FIG. 4.

According to the invention, and as seen in FIG. 3, a "Routing DTL" information element is added by the source node to the level 3 SETUP request of the caller. In a preferred embodiment of the invention, the Routing DTL IE is between six and sixty bytes in length, and as seen in FIG. 4 is essentially a concatenation of six-byte elements. Each six-byte element is formatted to provide certain desirable information which will permit a call to be routed from a source to a destination. The preferred format of each six-byte element is seen in FIG. 5. A first byte (byte 0) of the six-byte element is a node identification (e.g., APEX switch ID) which contains the node number which will be processing the DTL. The next two bytes (bytes 1 and 2) describe the node input and output ports which are receiving and sending the message. Since the preferred APEX switch identifies ports via "slots" and "links", bytes 1 and 2 are broken out as an "input slot ID" field, and "input link" field, and "output slot" field, and an "output link" field as shown in FIG. 5, although it will be appreciated that other switches might simply identify ports. The fourth byte (byte 3) is used to define a VPI value for the current segment of the connection, while the fifth byte (byte 4), and part of the sixth byte (byte 5) are used to define a VCI value for the current segment of the connection. Finally, four bits of the sixth byte are used to define a flag field, including a process flag, a link-up flag, a bandwidth flag, and a last big flag as are discussed in more detail below.

Figure 6:
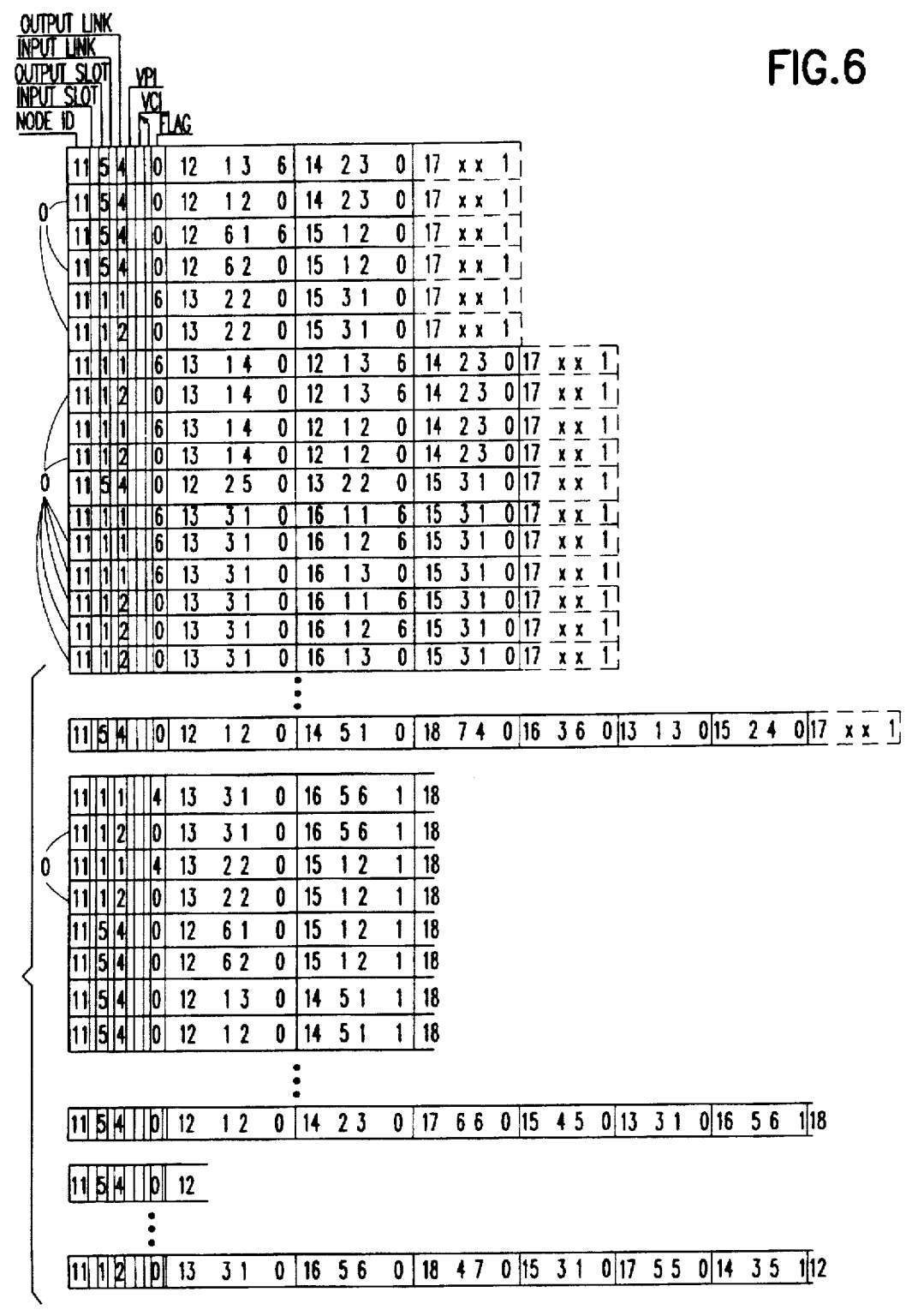

In accordance with a preferred aspect of the invention, each source node stores a plurality of DTLs which describe routes to each destination reachable by the source node; each DTL being formatted in a manner such as seen in FIGS. 4 and 5. Thus, with reference again to FIG. 1, source node 11, for example, would store DTLs which would describe paths from node 11 to nodes 12, 17, and 18 (additional DTLs to destinations 19a–19f not being required due to the provision of a "last bit" flag as described below). The DTLs stored by source node 11 are preferably sorted by destination node address, with the DTLs for a single destination address being ordered based on user optimization criteria (e.g., cost, bandwidth, number of hops, etc.). A partial listing (in decimal form) of DTLs for the source node 11 is seen in FIG. 6, with the first group of DTLs relating to destination node address 17, a second group of DTL relating to destination node address 18, and a third group of DTLs relating to destination node address 12. It should be appreciated that when stored at the node, the DTLs are stored in binary format with only three bytes per DTL element required, as only the node ID, output port, and flags need be stored. However, as shown in FIG. 6, when the DTL is attached to the CALL SETUP message, the DTL preferably assumes a format with six byte elements so that the input port and VPI/VCI can be added at each node.

As is seen in FIG. 6, the six shortest paths from node 11 to 17 (all having three hops) are described by the first six DTLs of the listing. It should be noted that in fact, only three of those six DTLs need be listed, as the second, fourth, and sixth DTLs (denoted by "O" for "optional") are parallel routes between nodes 12 and 14, 12 and 15 and 11 and 13 respectively, which are indicated as available due to the value (decimal "6") of the flags (as discussed below). It should also be noted that the destination node of the DTLs shown in FIG. 6 typically need not be stored as part of the DTL, as the output port of the previous element of the DTL defines which node will be receiving the message. When the destination node receives the message, it will know from the called party number which is contained in the IEs of the CALL SETUP message where to route the call. Thus, in FIG. 6, while the destination node is shown for purposes of understanding, it is not typically included as part of the DTL stored at the source node. Also, as discussed in more detail below, where the "last node" flag is not set to a value "1" in the last element of the DTL, the node prior to the destination can add an element to the DTL. Again it is noted that because it is not necessary to provide a DTL element to store the destination node information, the destination node (e.g., nodes 17 and 18) is shown in FIG. 6 only for purposes of clarity of explanation; i.e., which node is receiving the message. Where the destination node is shown as part of a phantom (dotted lines) DTL element, the element likewise is not stored as part of the DTL list, but is to be added by the node previous to the destination, as discussed in more detail below with reference to the "last node" flag.

The next eleven shortest paths (all having four hops) are described by the next eleven DTLs of the listing. In this case seven of the eleven DTLs are denoted optional and need not be stored due to parallel routes. However, they are shown in FIG. 6 for purposes of understanding what possible routes could be taken.

While other DTLs are not shown in FIG. 6 for the destination address 17 except for one of the most complex paths having seven hops, it will be appreciated that many additional DTLs for that destination are preferably kept in the listing.

The DTL listing of FIG. 6 is shown continuing with the eight shortest paths from node 11 to node 18, and one of the most complex paths from node 11 to node 18, and the shortest paths from node 11 to node 12, and one of the most complex paths from node 11 to node 12. Again, some of the paths need not be stored as they are optional parallel paths.

Those skilled in the art will appreciate that the DTLs actually shown in FIG. 6 are not complete with information. In particular, each six-byte element of the DTL has a node value, an output slot ID—output link (together comprising an output port) value, and flag values inserted, with the values being shown in decimal form (although they are preferably stored in binary form). The reason that the stored DTL need not be complete is that upon receiving the SVC call, the receiving node knows at which input port it is receiving the request. Thus, the receiving node can insert that information into the DTL. In addition, the receiving node can insert whatever VPI and VCI values it desires into the VPI and VCI fields, as it determines those values. The only information that the receiving node requires is the output port to which the node should connect the request; and that information is provided by the DTL.

As aforementioned, the CALL SETUP message is formatted with a routing DTL information element, and that information element includes a concatenation of six byte elements which according to a preferred aspect of the invention includes a four bit flag field. In accord with the invention, the four flags include a "process" flag, a "link up" flag, a "bandwidth" flag, and a "last node" flag. The "process" flag is used to indicate whether an element of the DTL has been processed by a node. Thus, when a node receives the DTL, it looks for the first element of the DTL which has not had the process flag set. That element should include the node ID of the receiving node. Upon finding the appropriate DTL element, the receiving node changes the process flag of the element, inserts the input slot ID and input link (i.e., the receiving port) values in their appropriate fields, and designates a VPI/VCI for that element. Then, the receiving node forwards the message with the updated DTL to the output port designated by the DTL (typically via a cross-connect switch) even if peer boundaries are crossed. By utilizing the process flag rather than deleting the DTL element from the DTL, the updated and completed DTL can be sent back from the destination node to the source node as an information element of the connect request message as discussed hereinafter, or an updated DTL can be sent back from any failure point in the system. The returned information can then be used for diagnostic purposes.

The "link up" flag is used to indicate that an alternative route (parallel link) is available between two nodes; such as links "e" and "f" between nodes 12 and 14 as shown in FIG. 1. By setting the "link up" flag, if the link designated by the DTL (as indicated by the output port of a node) is down, the node is permitted to route the call setup message via the parallel link without kicking the request back to the originating node. This flexibility saves the time involved in receiving back a "setup failure" message, finding a new DTL, and resending the setup message with the new DTL. Moreover, if the node does indeed send the setup message via the alternative path, it changes the output slot ID and output link of its element of the DTL, and this information is eventually received back at the source node as will be described hereinafter, and can be used for diagnostic purposes. The setting of the link up flag is seen in FIG. 6 in several of the DTLs. In particular, wherever a flag value of "4" or "6" is provided (digital 0100 or 0110), the link up flag is set. On the other hand, it should also be appreciated that just because parallel paths exist, does not mean that the "link up" flag needs to be set. Thus, if a particular path is desired with no alternatives, even where a parallel path exists, the "link up" flag will not be set. Such a situation can be seen in FIG. 6 in the DTL listed as "|11 5 4 0|12 6 1 0|15 1 2 1|18" where the next listed DTL is a parallel path.

The third flag of the four flag field is the "bandwidth" flag which can be used to indicate that where an alternative route is available between two nodes, should the preferred link be too busy, the alternate link can be utilized. Thus, upon receiving a call setup message with the routing DTL, the receiving node can determine whether the bandwidth flag is set. If it is set, the node can access traffic information which the node generates to make a determination as to whether to use the alternate link. Again, if the alternate link is used, the node should reset the output slot ID and output link fields of its element of the DTL, as well as inserting values into the VPI/VCI field. The setting of the bandwidth flag is also seen in FIG. 6 in several of the DTLs. In particular, wherever a flag value of "6" is seen (digital 0110), the bandwidth flag is set.

The "last node" flag is a flag which is preferably used only in the last element of the concatenated DTL. If the last node flag is set, this provides an indication to the receiving node that the receiving node is the destination node. If the flag is not set (as seen in the first group of DTLs of FIG. 6 where the flag value is decimal "0"; digital 0000), upon receipt by the destination node, the destination node will internally generate a six byte route ID as the last element based on the destination address specified in the called party number IE for the call. In particular, the receiving node constructs the last element based on the NSAP address of the destination which contains the information necessary to reach the destination. For example, the last seven digits of the destination address (called party number) could be used to represent the node number (3 digits), slot number (2 digits) and link number (2 digits) respectively. The last node flag therefore permits routes to numerous destinations which fan out from a single destination node to be stored as a single DTL, thereby reducing memory requirements of the system. For example, with reference to FIG. 1, additional sets of DTLs to DTE destinations 19a–19f need not be stored at source node 11, as each destination may be reached by not setting the last node flag of the DTL. When the node prior to node 17 (e.g., node 14) receives the call setup request with the routing DTL and determines that the last node flag of the last element of the DTL is not set, that node (e.g., node 14) generates the additional DTL element (shown in phantom in FIG. 6 to indicate that the additional DTL element is not stored originally as part of the DTL) with node 17 as the node ID and the appropriate output port based on the destination NSAP address, and with a last bit flag set. When node 17 receives the CALL SETUP request with the DTL, it processes the last DTL element and terminates the message (although the message is typically sent to the DTE without the DTL).

Those skilled in the art will appreciate that the last node flag can also be used in a hierarchical system to cause the DTL to be provided to a bridge node. In particular, when the bridge node recognizes that its element is the last six-byte element of the DTL, but the last node flag of the DTL is not set, it will look at the destination address, and search its own DTL lists. Upon finding a path to the destination address, the bridge node will attach the new DTL to the old DTL (without deleting the old DTL), and forward the call setup request appropriately.

Figure 7A:
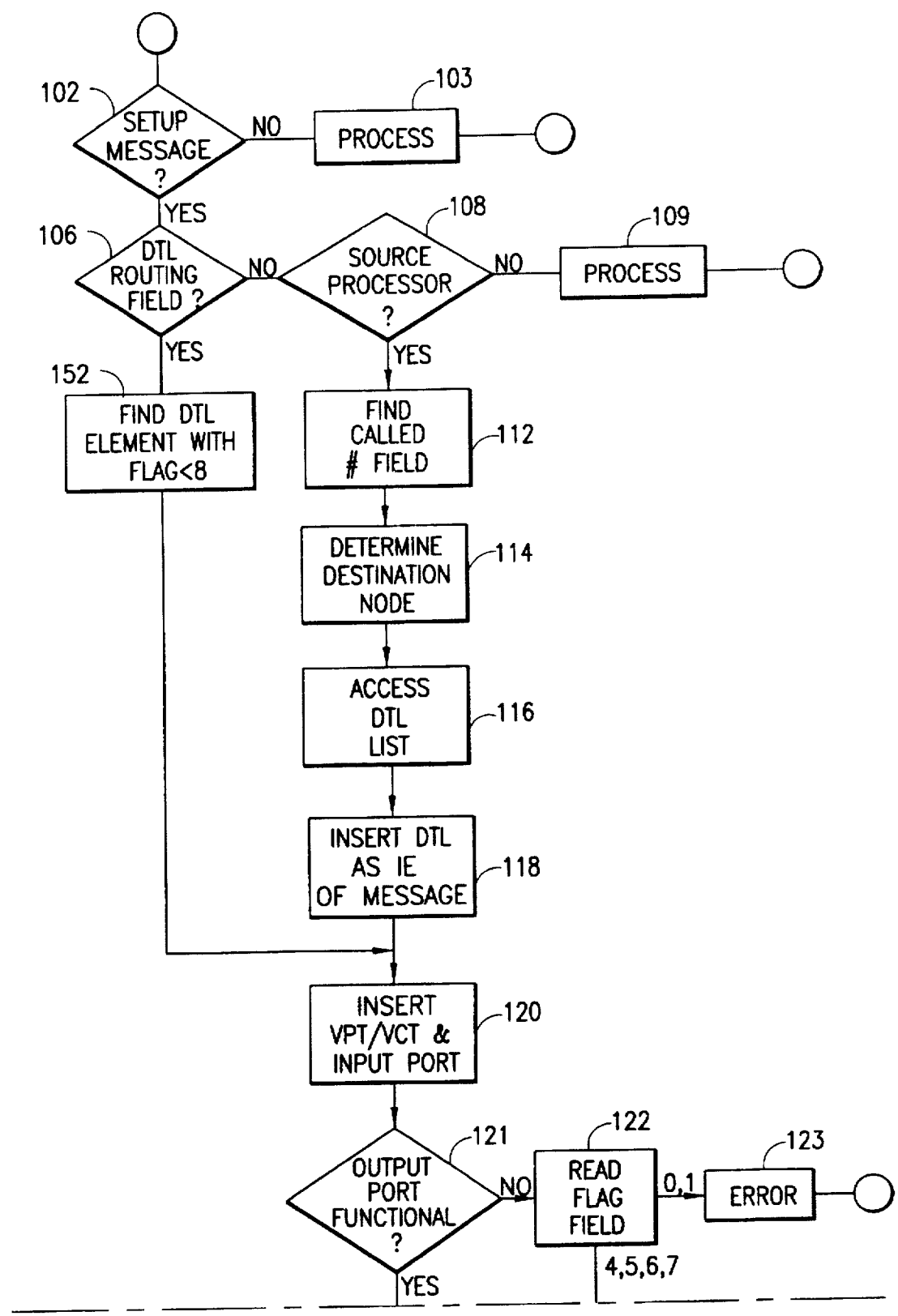
FIG. 7 is a flow chart of the processing and updating of a DTL at a node of the call setup path.
Figure 7B:
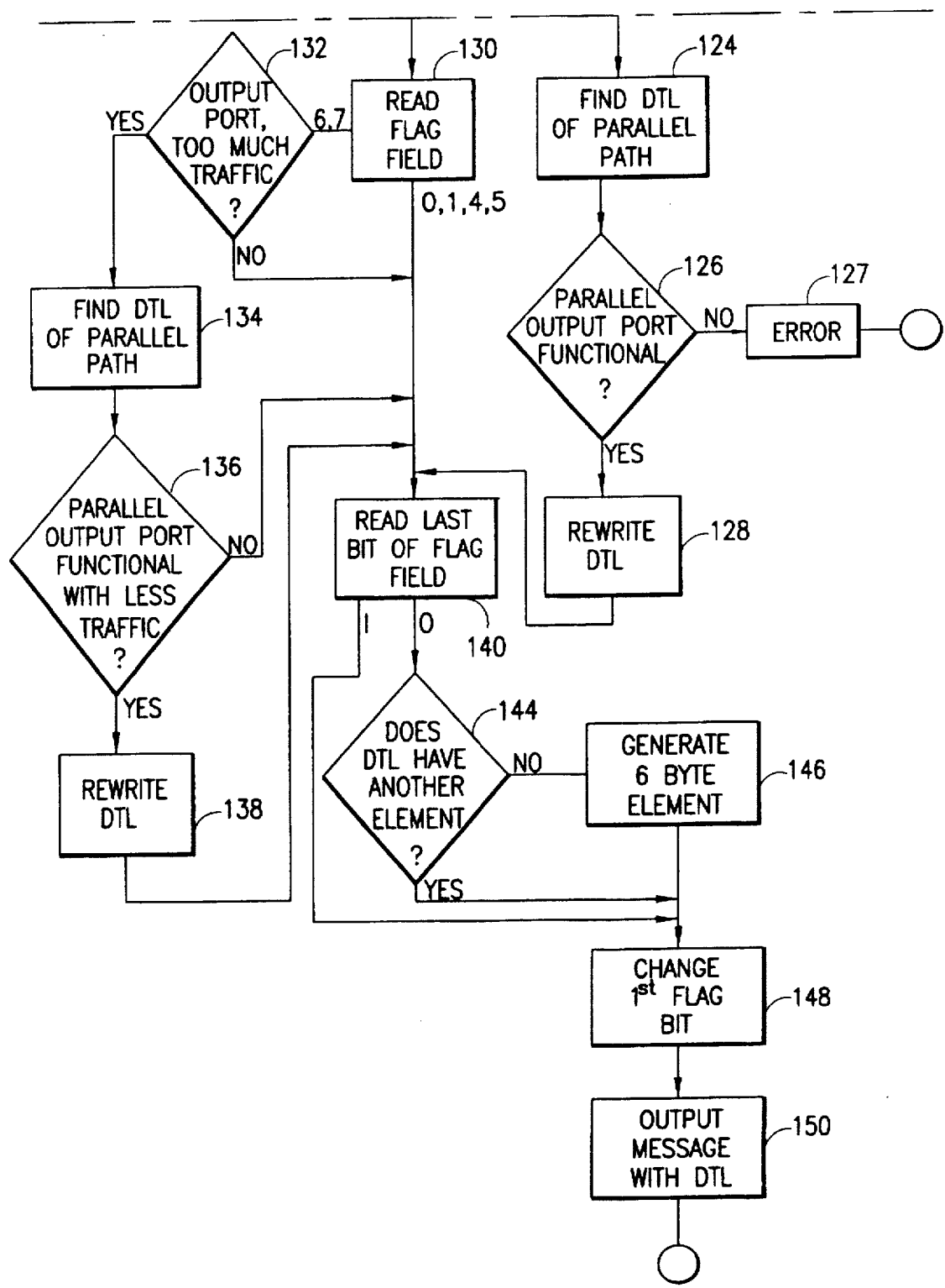

A flow chart of the operations conducted by processor means at a receiving node is seen in FIG. 7. At step 102 the processor parses the incoming message to determine whether it is a level 3 SETUP message. If not, the processor processes the message at 103 in a manner which is not relevant to the invention. However, if the incoming message is a level 3 SETUP message, the processor looks at the IEs of the message at 106 to determine if there is a routing DTL IE. If there is no routing DTL IE, and the processor is not a source processor as determined at 108, the message is handled at 109 in manners known in the prior art. However, if there is no routing DTL IE, and the processor is a source processor, at 112, the source processor will try to attach a DTL IE to the setup message. Thus, at 114, it either locates a destination node ID from the called party number or can be instructed by a routing table to acquire a destination node ID. The node ID is then used at 116 to locate an appropriate DTL for the given destination, typically via use of a pointer. At 118, the source node inserts the DTL which is being pointed to by the pointer as an information element of the call SETUP message. At 120, the processor designates a VPI/VCI which is added to the DTL and inserts the input port value. If the processor is the source processor, at 120, the source VPI/VCI specified by the user is inserted. At 121, the processor determines whether the output port designated by the DTL is functional (i.e., the output line is "up"). If the output port is not functional, at 122 the processor reads the value of the flag field of the DTL. If the value of the flag field is zero or one, at 123 an error message is generated as no alternate path is available, and the call is rejected and sent back to the originating node (according to standard protocol). If, at 124, the value of the flag field is four, five, six, or seven, (values of two and three always being improper) and if the processor is the source processor, the source processor searches and finds the DTL for the parallel path for the call. If the processor is an intermediate processor, it checks at 124 to see whether it has a parallel path to the node of the next element of the DTL. Regardless, at 126, the processor finds the output port for the parallel path and determines whether that output port is available. If not, at 127, an error message is generated and the call is rejected. If the alternative port is available, at 128, the processor writes a new output port number in the output port field of its element of the DTL, and the processing continues at 140 as will be described below.

Returning now to step 121, if the output port is functional, at step 130, the value of the flag field is read. If the value of the field is 0, 1, 4, or 5 the processing continues at 140 as will be described below. However, if the value of the flag field is 6, or 7, a decision is made at 132 as to whether the traffic at the output port is undesirably high. If it is not, the processing continues at 140. However, if the traffic is too high, at 134 the parallel path is found, and at 136 a determination is made as to whether the output port of the parallel path is functional and has the capacity to handle the call. If the parallel output port is not functional or has too much traffic, the processing continues at 140. If the parallel output port is functional and can handle the traffic, at 138, the output port field of that element of the DTL is rewritten, and the processing continues at 140.

At 140, the value of the last bit of the flag field is checked, and if it is zero, at 144, the source processor checks to see whether the DTL contains at least one additional six-byte element. If not, at 146, the source processor generates a six-byte element based on the called party number (the NSAP address). At 148, the source processor changes the first bit of the flag (i.e., changes the flag field to value eight) and at 150 forwards the message to the designated output port with the modified DTL. If at 144 the DTL does contain an additional element, the processing continues with steps 148 and 150.

Returning to step 140, if the value of the flag field is one, then the source processor recognizes that the source processor itself is the destination node, and the processing continues with steps 148 and 150.

Returning now to step 106, if upon receipt of a SETUP message, the DTL routing field is found, the source processor looks at 152 for the first six byte element of the DTL having a flag value of less than eight. The process then continues at step 120, with the source processor inserting the input port over which it received the message into the DTL element it is processing, and a VPI/VCI value for the outgoing message.

It should be appreciated by those skilled in the art, that as the CALL SETUP message with the DTL is passed from node to node, each node will fill in its input port and a VPI/VCI, until, at the destination of the call, the DTL is completely filled in. In response to the CALL SETUP message, the destination will typically generate a level 3 CONNECT message. In accord with the invention, and as seen in FIG. 8, the CONNECT message generated by the destination is substantially as specified in Section 5.3.1.3 of the User Network Interface Specification (V3.1), except that a routing DTL information element is added. In particular, the destination, upon receiving the CALL SETUP message parses the message and stores the call reference IE, the connection identifier, and the routing DTL IEs of the incoming message. The destination then uses those IEs as part of its CONNECT message, with the completed (filled-in) DTL of the received CALL SETUP message constituting the routing DTL IE of the CONNECT message. In processing a CONNECT message, the processor of the node reads the elements of the routing DTL in a reverse order, and substitutes output ports for input ports and vice versa in routing the message. In addition, if desired, the process flags can be ignored, as the node identifications can be used. Alternatively, at the destination, all process flags can be reset. As yet another alternative, all process flags which are part of a CONNECT message and have a value "1" may be treated as non-processed, and are the processor may change the process flags to value "0" to indicate that the element has been processed.

The DTL IE may also be included in a RELEASE message if desired.

According to another preferred aspect of the invention, means are provided at the source node to avoid during call set up previously failed routes and routes which incorporate failed hops. In a first embodiment, a list of failed hops is stored in memory, and the hops of each selected DTL are scanned and compared to the list. If there is a match between a hop in the DTL and the list of failed hops, the route indicated by the DTL is not used, and a next DTL is chosen for scanning and comparison until a DTL with no match to the failed hops list is found. After a preset time period on the list, a failed hop may be removed from the list and tried again. In a second embodiment, an index table sorted by destinations is maintained at the source node to provide groups of DTLs. Initially, the index for each destination is set to point to a first DTL for the group. If a call attempt is rejected due, e.g., to a failed hop, the index (pointer) for this destination is changed to the next available DTL in the group which does not contain the failed hop. Again, all indices may be reset to their initial values on a periodic basis which is reasonably long enough such that a previously failed route might have had a chance to recover.

In accord with another aspect of the invention, a user interface is provided in conjunction with the implementation of DTL routing. Thus the workstation 50 of FIG. 2 is preferably used to both provide the DTLs to the switch, as well as to receive partially or totally processed DTLs evidencing failed and successful routing. Thus, the user interface preferably permits the complete route for an established SVC to be displayed, as well as the non-completed DTL of a failed route attempt.

It will be appreciated by those skilled in the art that with the systems and methods described, only the source nodes need store DTLs, as the when CALL SETUP calls are received at intermediate nodes, the DTL will provide the necessary routing information for the intermediate node. In addition, it should be appreciated that the provision of DTLs eliminates the need to access large look-up charts at each node, thereby expediting the process. A further advantage of the systems and methods of the invention is that detailed information regarding the routing of the SVC calls is obtained, thereby providing useful diagnostic information in the situations where the routing fails, and where the routing is successful.

There have been described and illustrated herein systems and methods for routing ATM switched virtual circuit calls. While particular embodiments of the invention have been described, it is not intended that the invention be limited thereto, as it is intended that the invention be as broad in scope as the art will allow and that the specification be read likewise. Thus, while the invention has been described with particular reference to the APEX switch of General DataComm, Inc. and to other hardware, it will be appreciated that other switches and hardware arrangements could be utilized. Furthermore, a change in hardware might cause a change in the format of the elements of the DTL used in the CALL SETUP message can be changed. For example, rather than using a six byte format, the elements of the DTL could be a different number of bytes, as the node ID and output port numbers could use different numbers of bits, while the VPI/VCI, input port numbers, and flags, while adding functionality to the system, are not absolutely required. In addition, it will be appreciated that the invention was described with reference to particular Standards and Recommendations. However, the invention of storing a plurality of DTLs at source nodes and adding, at the source node, a routing DTL field to a call setup message is intended to apply to all call setups of ATM switched virtual circuits regardless of whether changes are made to other aspects of the call setup message (i.e., whether or not the Standards and Recommendations are changed). Further yet, while the invention was described as utilizing certain flags, it will be appreciated that other flags could be utilized to provide additional functionality. It will therefore be appreciated by those skilled in the art that yet other modifications could be made to the provided invention without deviating from its spirit and scope as so claimed.

We claim:

1. Apparatus at a source node of an ATM telecommunications network, comprising:
   a) switching means including a plurality of input ports and a plurality of output ports for receiving a message at one of said plurality of input ports, and switching said message to one of said plurality of output ports;
   b) memory means for storing a plurality of designated transit lists (DTLs), each designated transit list (DTL) including a plurality of list elements with each list element including a node identification and an output port identification, each DTL identifying a route from said source node to a destination in said ATM telecommunications network; and
   c) processor means coupled to said switching means and to said memory means for processing said message, for attaching an appropriate one of said plurality of DTLs to a CALL SETUP message upon one of said plurality of input ports receiving said CALL SETUP message with a called address, and for providing in a list element of said appropriate DTL a field for receiving one of an input port value and a VPI/VCI value.

2. An apparatus according to claim 1, wherein:
said plurality of DTLs are grouped by destination node address.

3. An apparatus according to claim 1, wherein:
said field for receiving one of an input port value and a VPI/VCI value comprises a VPI/VCI field for receiving a VPI/VCI value, and said processor means provides a VPI/VCI value for said VPI/VCI field of a first element of said appropriate DTL based on a VPI/VCI provided by a user who provides said message.

4. An apparatus according to claim 1, wherein:
said field for receiving one of an input port value and a VPI/VCI value comprises an input port field for receiving an input port value, and said processor of said apparatus provides a value for said input port field of a first list element of said DTL based on which of said plurality of input ports said message is received.

5. An apparatus according to claim 1, wherein:
each list element includes a flag field with a flag value, said flag field including a process flag indicating whether said list element has been processed by said processor, wherein said processor changes a value of said process flag of a first list element of said DTL after processing said message.

6. An apparatus according to claim 1, wherein:
each list element includes a flag field with a flag value, said flag field including a link-up flag indicating whether a parallel alternative output port is available to carry said message to a next node indicated by a node identification of a next element of said DTL.

7. An apparatus according to claim 1, wherein:
each list element includes a flag field with a flag value, said flag field including a last node flag indicating whether the node identified by the node identification of said list element is a destination of said message.

8. An apparatus according to claim 7, wherein:
a single one of said plurality of DTLs is used for routing said message to a plurality of destinations coupled to a single destination node by setting said last node flag of a last element of said DTL to indicate that said node identified by the node identification of said last element is not a destination of said message.

9. An apparatus according to claim 1, wherein:
each list element as stored in said memory means is comprised of at least two bytes including at least one byte for said node identification and a plurality of bits for said output port identification.

10. An apparatus according to claim 1, wherein:
each list element as stored in said memory means is comprised of at least two bytes including at least one byte for said node identification, a plurality of bits for said output port identification, and at least one bit for a flag.

11. An apparatus according to claim 2, wherein:
said processor means includes means for avoiding previously failed routes and routes which incorporate failed hops during a CALL SETUP.

12. An apparatus according to claim 11, wherein:
said means for avoiding includes means for storing a list of failed hops in said memory means, and means for scanning hops of each selected DTL and comparing scanned hops to said list.

13. An apparatus according to claim 11, wherein:
said plurality of DTLs are stored in said memory means in groups by destination node address, and
said means for avoiding includes pointer means for pointing to a first DTL in a particular group, and means for causing said pointer to point to another DTL in said particular group upon said processor determining that said first DTL includes a failed hop, said another DTL being a first next DTL in said group not including said failed hop.

14. Apparatus at a source node of an ATM telecommunications network, comprising:
a) switching means including a plurality of input ports and a plurality of output ports for receiving a message at one of said plurality of input ports, and switching said message to one of said plurality of output ports;
b) memory means for storing a plurality of designated transit lists (DTLs), each designated transit list (DTL) including a plurality of list elements with each list element including a node identification, an output port identification, and at least one flag, each DTL identifying a route from said source node to a destination in said ATM telecommunications network; and
c) processor means coupled to said switching means and to said memory means for processing said message.

15. An apparatus according to claim 14, wherein:
said processor means for attaching an appropriate one of said plurality of DTLs to a CALL SETUP message upon one of said plurality of input ports receiving said CALL SETUP message with a called address.

16. An apparatus according to claim 15, wherein:
said at least one flag comprises a process flag indicating whether said list element has been processed by said processor, wherein said processor changes a value of said process flag of a first list element of said DTL after processing said message.

17. An apparatus according to claim 15, wherein:
said at least one flag comprises a link-up flag indicating whether a parallel alternative output port is available to carry said message to a next node indicated by a node identification of a next element of said DTL.

18. An apparatus according to claim 15, wherein:
said at least one flag comprises a last node flag indicating whether the node identified by the node identification of said list element is a destination of said message.

19. An ATM telecommunications network, comprising:
a) a first plurality of source nodes, each source node having
(i) first switching means including a plurality of first input ports and a plurality of first output ports for receiving a message at one of said plurality of first input ports, and switching said message to one of said plurality of first output ports,
(ii) memory means for storing a plurality of designated transit lists (DTLs), each designated transit list (DTL) including a plurality of list elements with each list element including a node identification and an output port identification for said node identification, and each DTL identifying a route from a source node to a destination in said ATM telecommunications network,
(iii) first processor means coupled to said first switching means for processing said message and for attaching an appropriate one of said plurality of DTLs to a CALL SETUP message upon one of said plurality of first input ports receiving said CALL SETUP message with a called address, and
b) a second plurality of intermediate nodes, each intermediate node having
(i) second switching means including a plurality of second input ports and a second plurality of output ports for receiving said message at one of said plurality of second input ports, and switching said message to one of said plurality of second output ports based on said appropriate DTL, and
(ii) second processor means coupled to said second switching means for routing said message through said second switching means, and for inserting one of an input port value and a VPI/VCI value into a list element of said appropriate DTL.

20. An ATM telecommunications network according to claim 19, wherein:
each said list element when said appropriate DTL is attached to said CALL SETUP message further includes a VPI/VCI field, and said first processor means provides a first VPI/VCI value for said VPI/VCI field of a first element of said DTL based on a VPI/VCI provided by a user who provides said message, and each said second processor means receiving said DTL provides a VPI/VCI value for the VPI/VCI field of a respective element of said DTL.

21. An ATM telecommunications network according to claim 19, wherein:
each said list element when said appropriate DTL is attached to said CALL SETUP message further includes an input port field, and said first processor means provides a value for said input port field of a first list element of said DTL based on which of said plurality of first input ports said message is received, and each said second processor means receiving said DTL provides a value for said input port field of a respective element of said DTL.

22. An ATM telecommunications network according to claim 19, wherein:

each said list element further includes a flag field, said flag field including a process flag indicating whether said list element has been processed by a processor, wherein said first processor means changes a value of said process flag of a first list element of said DTL after processing said message, and each said second processor means receiving said DTL changes a value of said process flag of a respective element of said DTL after processing said message.

23. An apparatus according to claim 19, wherein:

each said list element further includes a flag field, said flag field including a link-up flag indicating whether a parallel alternative output port is available to carry said message to a next node indicated by a node identification of a next element of said DTL.

24. A method for routing switched virtual circuit (SVC) ATM call setups, comprising:

a) storing a plurality of designated transit lists (DTLs) at an originating node, each DTL having at least one list element including a node identification and an output port of an identified node;

b) when a CALL SETUP message is received at the originating node, choosing a desired designated transit list (DTL) from said plurality of DTLs, inserting said desired DTL into an information element (IE) of the CALL SETUP message, and inserting at least one of a VPI/VCI value and an input port value into the list element.

25. A method according to claim 24, wherein:

each element of each DTL includes a flag.

26. A method according to claim 24, further comprising:

passing said desired DTL with said CALL SETUP message from node to node based on the node identifications in said desired DTL, and inserting, at each node, an input port at which said CALL SETUP message is received.

27. A method according to claim 26, further comprising:

at each node, inserting a VPI/VCI into an element of said DTL.

28. A method according to claim 27, further comprising:

returning said desired DTL with inserted VPI/VCI values from a destination node to the originating node.

29. A method according to claim 26, wherein:

each element of each DTL includes a flag, and at each node, switching said CALL SETUP message based on the value of said flag.

30. A method for routing switched virtual circuit (SVC) ATM call setups, comprising:

a) storing a plurality of designated transit lists (DTLs) at an originating node, each DTL having at least one list element including a node identification, an output port of an identified node, and a flag;

b) when a CALL SETUP message is received at the originating node, choosing a desired designated transit list (DTL) from said plurality of DTLs, and inserting said desired DTL into an information element (IE) of the CALL SETUP message.

* * * * *